(12) United States Patent
LoRusso

(10) Patent No.: US 7,252,187 B2
(45) Date of Patent: Aug. 7, 2007

(54) DELIVERY SYSTEM FOR USE IN MOTOR VEHICLES

(76) Inventor: Louis LoRusso, 21 Irving Dr., Walpole, MA (US) 02081

( * ) Notice: Subject to any disclaimer, the term of this patent is extended or adjusted under 35 U.S.C. 154(b) by 0 days.

(21) Appl. No.: 10/877,416

(22) Filed: Jun. 25, 2004

(65) Prior Publication Data

US 2005/0284729 A1  Dec. 29, 2005

(51) Int. Cl.
    *B65G 47/34* (2006.01)
(52) U.S. Cl. .................................. 198/465.4
(58) Field of Classification Search ............ 198/465.4, 198/571, 575, 680, 684, 685
    See application file for complete search history.

(56) References Cited

U.S. PATENT DOCUMENTS

| | | | |
|---|---|---|---|
| 3,133,660 A * | 5/1964 | Roberts | 220/491 |
| 3,667,624 A * | 6/1972 | Ogura et al. | 414/798.3 |
| 3,707,925 A * | 1/1973 | Byrnes, Sr. | 104/167 |
| 3,812,956 A * | 5/1974 | Hindermann | 198/575 |
| 4,145,724 A * | 3/1979 | Medding et al. | 360/92 |
| 4,386,382 A * | 5/1983 | Cutler et al. | 360/92 |
| 4,510,539 A * | 4/1985 | Young | 360/92 |
| 4,977,996 A * | 12/1990 | Duce | 198/349.95 |
| 5,002,176 A * | 3/1991 | Lotzer et al. | 198/465.4 |
| 5,416,653 A * | 5/1995 | Marlowe | 360/92 |
| 5,919,023 A * | 7/1999 | Owens, Jr. | 414/155 |
| 6,382,396 B1 * | 5/2002 | Dana et al. | 198/465.4 |
| 6,682,291 B2 * | 1/2004 | Schatzler et al. | 414/462 |
| 6,938,554 B2 * | 9/2005 | Aaltonen et al. | 104/173.1 |

* cited by examiner

*Primary Examiner*—Joe Dillon, Jr.
(74) *Attorney, Agent, or Firm*—Law Office of J. Shedd & Associates, PC

(57) ABSTRACT

This is a device that is designed as a conveyance system for use in the interior of any type of vehicle and other myriad uses such as a home, warehouse, closet, etc. The conveyance system is anchored to the interior roofline of a vehicle; it has a conveyor such as a pulley, track or slide, a holding apparatus such as a basket or similar object for stowing items in, and a method of moving the conveying device and basket from the front of the vehicle to the rear of the vehicle.

5 Claims, 3 Drawing Sheets

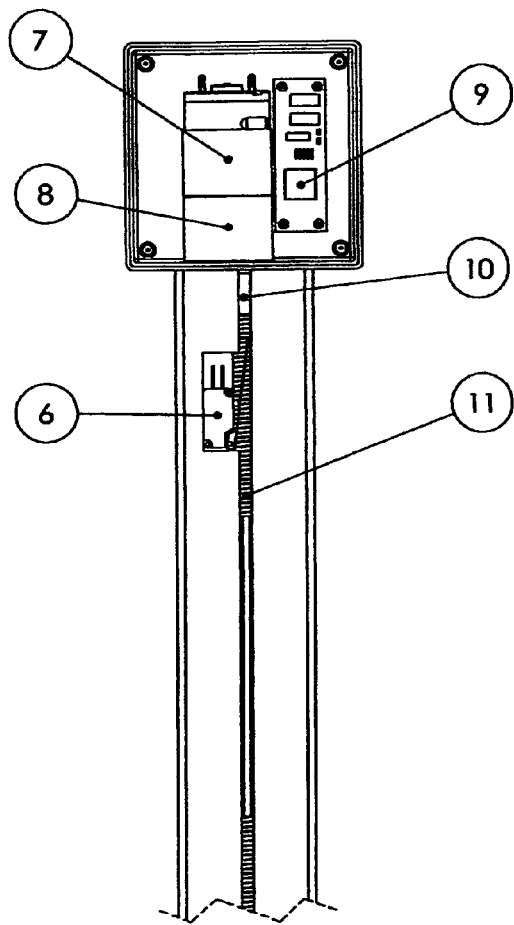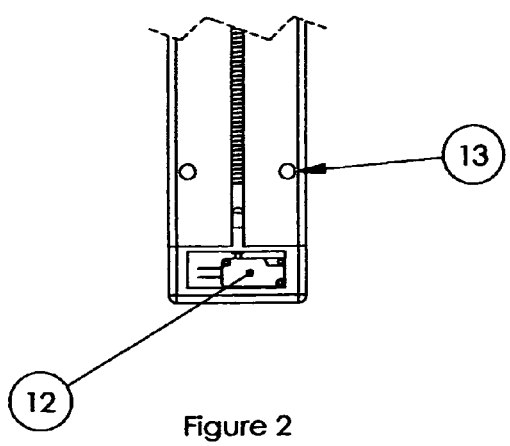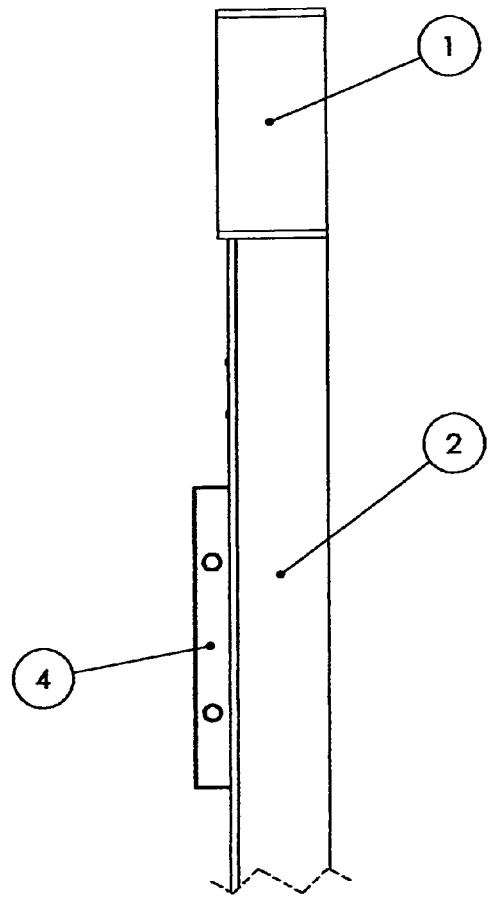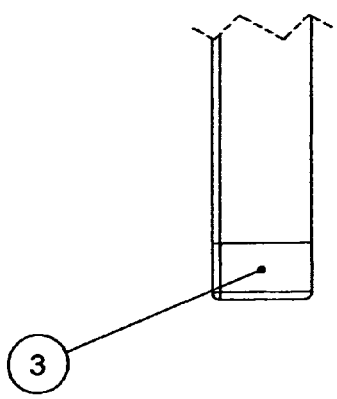
Figure 2
Figure 3

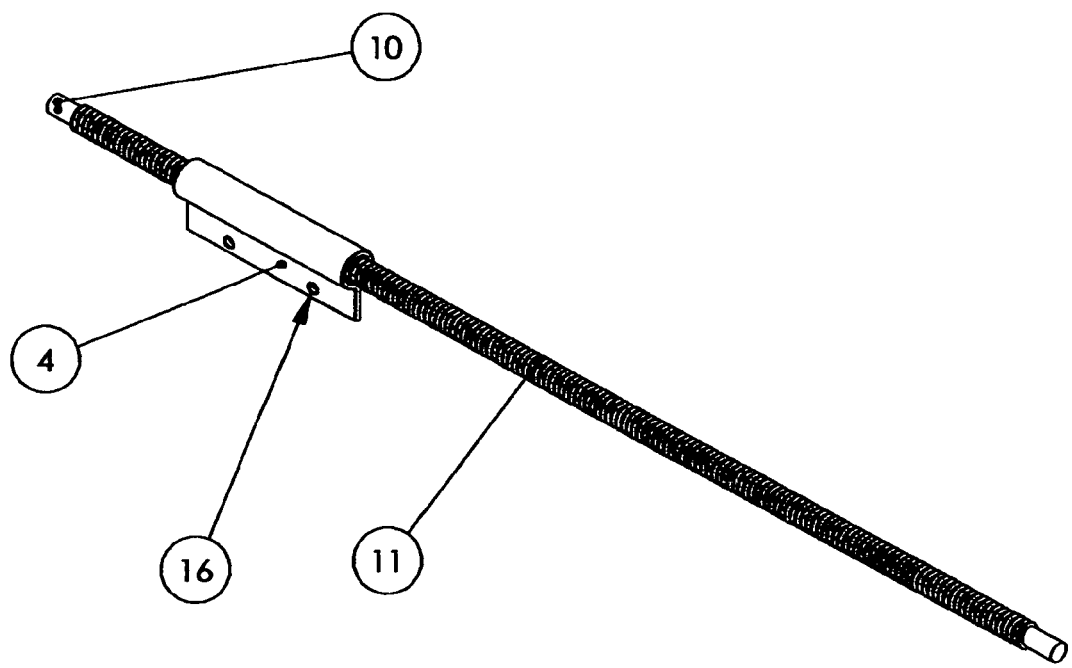
Figure 4
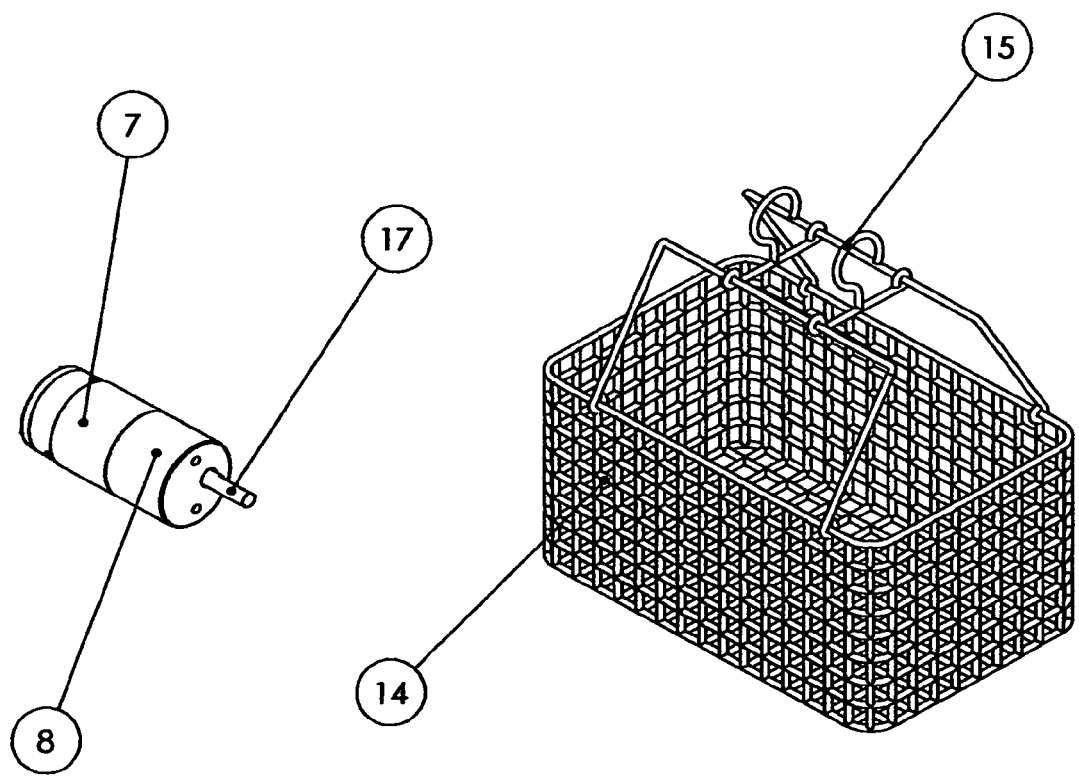
Figure 5
Figure 6

DELIVERY SYSTEM FOR USE IN MOTOR VEHICLES

BACKGROUND OF THE INVENTION

As any parent or caretaker with small children knows, keeping your eyes on the road while operating a motor vehicle, and attending to the small children in the rear of the vehicle can be quite a taxing challenge. To that end, any parent or caretaker of a small child would be benefited with a system to assist moving items from the front of a vehicle to the rear of the vehicle with the minimal distraction.

Thus was born the Delivery System for use in Motor Vehicles device. It is simple in concept and can be adapted to a wide variety of usages and configurations. The inventor initially installed two weighted stanchions in the front and rear or his van. Strung between the two stanchions was a simple "clothesline" like rope and pulley system. A basket was attached to the lower portion of the rope. When his children requested something from the front seat, such as juice boxes, snack or books the inventor simply put the requested item in the basket and let the children "pulley" it back to them where they could extricate the requested item. Since that time many other methods of employing the device have been contemplated. For instance, one could employ a lead screw design and a molded plastic sheath for said lead screw that could be easily retrofitted to the roof of any vehicle. Other methods include a pneumatic tube, or chain drive, or belt drive, or other such means of delivery.

PRIOR ART

There are no devices that allow the conveyance of articles between the front and back of a vehicle in the prior art. The closet patent to this present invention is as follows:

U.S. Pat. No. 6,682,291 by inventor Schatzler teaches the use of a Transport Device for loading and unloading a trunk space

SUMMARY OF THE INVENTION

This is a device that is designed as a conveyance system for use in the interior of any type of vehicle. The conveyance system is anchored to the interior roofline of a vehicle; it has a conveyor such as a pulley, track or slide, a holding apparatus such as a basket or similar object for stowing items in, and a method of moving the conveying device and basket from the front of the vehicle to the rear of the vehicle.

The invention is comprised of three major sub-assemblies. These include the power drive and electronic control box, the conveyor track, and the saddle nut with hanging carrier. It is powered by the vehicle's electrical system and comprises an electronic control circuit that allows the safe operation of the device from one to several simple push button(s).

The device is designed to allow a person in the front seat of a vehicle to deliver items to the passengers in the rear seats, without having to reach back, get out of the vehicle, and most importantly take their attention away from driving the vehicle in a safe manner.

BRIEF DESCRIPTION OF THE DRAWINGS

FIG. 2 depicts the underside of the conveyor track, including a lead screw; the power drive and electronics control box uncovered and the travel limit switches.

FIG. 3 depicts a side view of the conveyor track including the guide rail end cap FIG. 4 depicts the Acme lead screw, the power drive lead screw coupling, and the saddle nut follower and basket hanger.

FIG. 5 depicts the power drive motor, the power drive gear reduction box and the power drive motor shaft with Weldon coupling flat.

FIG. 6 depicts an example carrier and the basket hanging hooks.

DETAILED DESCRIPTION OF THE PREFERRED EMBODIMENT

Figure 1:
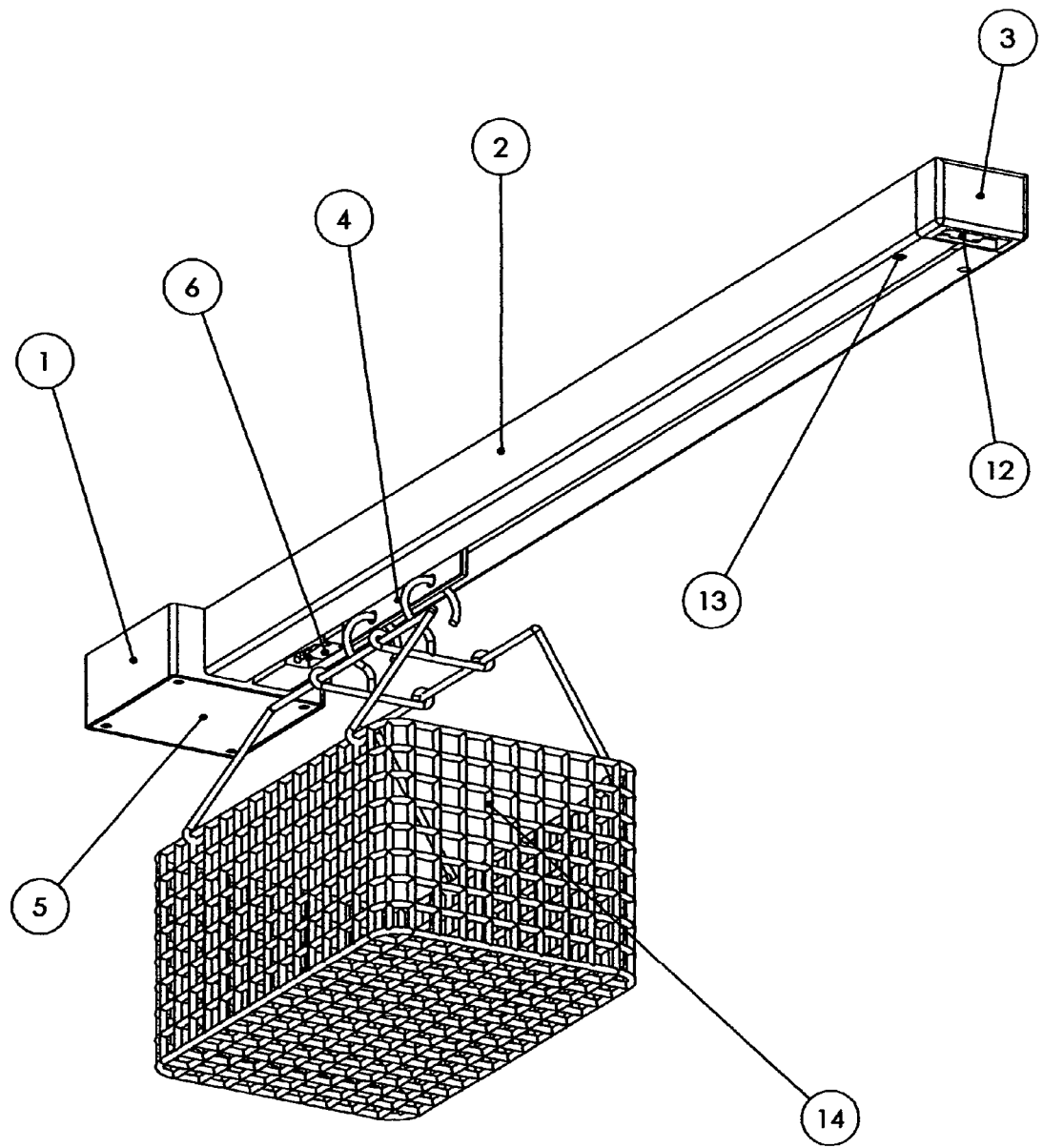
FIG. 1 depicts the entire device (although foreshortened), including a sample carrier, in a three dimensional, isometric view.

The terminology used herein should be interpreted in its broadest reasonable manner, even though it is being utilized in conjunction with a detailed description of a certain specific preferred embodiment of the present invention. This is further emphasized below with respect to some particular terms used herein. Any terminology that the reader should interpret in any restricted manner will be overtly and specifically defined as such in this specification. The preferred embodiment of the present invention will now be described with reference to the accompanying drawings, wherein like reference characters designate like or similar parts throughout.

As mentioned in the Summary of Invention, the invention is comprised of three major sub-assemblies. These include the power drive and electronics control box system (FIGS. 1, 3 and 5), the conveyor track system (FIGS. 1, 2, and 3) and the saddle nut with hanging carrier system (FIGS. 1, 3 and 4). Each sub-system will be described in kind.

Power Drive and Electronics Control Box System

The power drive and electronics control box 1 (as shown in FIGS. 1, 3) and the power drive and electronic control box cover 5 (as shown in FIGS. 1, 2) house the power drive motor 7 (as shown in FIGS. 2, 5), the gear reduction 8 (as shown in FIGS. 2, 5) and the control circuit board 9 (as shown in FIG. 2), which provides the operational logic for the device.

The control logic circuit board 9 (as shown in FIG. 2) and the power drive motor 7 (as shown in FIGS. 2, 5) and the gear reduction 8 (as shown in FIGS. 2, 5) are located and attached to the inside of the power drive and electronics control box 1 (as shown in FIGS. 1, 3).

The control logic circuit board 9 (as shown in FIG. 2) is wired to the power drive motor 7 (as shown in FIGS. 2, 5) and is connected to the vehicle's power system through a fused circuit. Additionally, the control logic circuit board 9 (as shown in FIG. 2) is connected to the two limit switches 6,12 (as shown in FIGS. 1, 2) as well as the start/stop button, located elsewhere in the vehicle, for operational control input.

A removable power drive and electronics control box cover 5 (as shown in FIG. 1) is attached to the bottom of the power drive and electronics control box 1 (as shown in FIGS. 1, 3) with four counter sunk screws located in each corner. This seals the power drive electronic control box 1 (as shown in FIGS. 1, 3) from all access and outside elements.

The power drive and electronics control box 1 (as shown in FIGS. 1, 3) is mounted to the end of the conveyor track 2 (as shown in FIGS. 1, 3) using counter sunk screws located inside the power drive and electronics control box wall, and provide proper registration of the power drive motor shaft 17 (as shown in FIG. 5) with the lead screw coupling 10 (as shown in FIGS. 2, 4).

Start/Stop Button

There may be from one to several start/stop buttons provided. These buttons are simple normally open contact buttons used to either start or stop the operation of the device. The start/stop button is wired to the control logic circuit board 9 (as shown in FIG. 2) located in the power drive and electronics control box 1 (as shown in FIGS. 1, 3). When more then one button is used they are to be wired in parallel. As the name implies, this button, when pressed, will either start or stop the operation of the device.

Control Logic Circuit Board

The control logic circuit board 9 (as shown in FIG. 2) provides electronic circuitry that will control the operation of the power drive motor 7 (as shown in FIGS. 2, 5) and gear reduction 8 (as shown in FIGS. 2, 5) through the input from either limit switches 6, 12 (as shown in FIGS. 1, 2) or start/stop buttons.

Both the limit switches 6, 12 (as shown in FIGS. 1, 2) and the start/stop buttons are wired to the control logic circuit board 9 (as shown in FIG. 2). When either of the limit switches 6, 12 (as shown in FIGS. 1, 2) or a start/stop button is closed, the control logic circuit board 9 (as shown in FIG. 2) will stop the power drive motor 7 (as shown in FIGS. 2, 5) and gear reduction 8 (as shown in FIGS. 2, 5) if currently running. If the start/stop button is pressed while the power drive motor 7 (as shown in FIGS. 2, 5) and gear reduction 8 (as shown in FIGS. 2, 5) is stopped, the device will start and the saddle nut 4 (as shown in FIGS. 1, 3, 4) will move in the opposite direction it was last stopped in.

This allows the device to be started and stopped at any point in its travel as well as automatically stopping when the saddle nut 4 (as shown in FIGS. 1, 3, 4) arrives at either limit switch 6, 12 (as shown in FIGS. 1, 2) located at the ends of the conveyor track 2 (as shown in FIGS. 1, 3).

Conveyor Track System

The conveyor track 2 (as shown in FIGS. 1, 3) is the principal element in this design. It provides housing for the linear motion device, in this case an Acme lead screw 11 (as shown in FIGS. 2, 4) and saddle nut 4 (as shown in FIGS. 1, 3, 4). It also holds one of the two limit switches 6, 12 (as shown in FIGS. 1, 2) used to stop the power drive 7 (as shown in FIGS. 2, 5) and gear reduction 8 (as shown in FIGS. 2, 5) when the saddle nut 4 (as shown in FIGS. 1, 3, 4) reaches the end of the conveyor guide rail 2 (as shown in FIGS. 1, 3). The conveyor track 2 (as shown in FIGS. 1, 3) can be made from an extruded composite material that provides a minimum amount of conformity to irregular mounting surfaces. The Acme lead screw 11 (as shown in FIGS. 2, 4) is comprised of a self-lubricating composite material such as Ultra High Molecular Weight Polyethylene (UHMW-PE). This material also allows the Acme lead screw 11 (as shown in FIGS. 2, 4) to conform to irregular curves in the above-mentioned conveyor track 2 (as shown in FIGS. 1, 3).

Conveyor Track

The conveyor track 2 (as shown in FIGS. 1, 3) provides the housing for the Acme lead screw 11 (as shown in FIGS. 2, 4) and the saddle nut 4 (as shown in FIGS. 1, 3, 4). It also provides locations for the limit switches 6, 12 (as shown in FIGS. 1, 2), limit switch end cap 3 (as shown in FIGS. 1, 3), the power drive and electronics control box 1 (as shown in FIGS. 1, 3) and device's mounting holes 13 (as shown in FIGS. 1, 2).

An end cap 3 (as shown in FIGS. 1, 2, 3) is pressed into and attached to the opposite end of the conveyor track 2 (as shown in FIGS. 1, 3) from the power drive and electronics control box 1 (as shown in FIGS. 1, 3). This end cap 3 (as shown in FIGS. 1, 2, 3) also centers the Acme lead screw 11 (as shown in FIGS. 2, 4) in the conveyor track 2 (as shown in FIGS. 1, 3) as well as provides a mounting place for the end-limit switch assembly 12 (as shown in FIGS. 1, 2).

There are two limit switches 6, 12 (as shown in FIGS. 1, 2) used to automatically stop the movement of the saddle nut 4 (as shown in FIGS. 1, 3, 4) when it arrives at either end of the conveyor track 2 (as shown in FIGS. 1, 2, 3). These limit switches 6, 12 (as shown in FIGS. 1, 2) are wired to the control logic circuit board 9 (as shown in FIG. 2) to provide for automatic stopping of the device.

Additionally, a traveler button spring 12 (as shown in FIGS. 1, 3) is located in the limit switch end cap 3 (as shown in FIGS. 1, 3) to provide a compressible action for the end-limit switch 12 (as shown in FIGS. 1, 3). This traveler button spring 12 (as shown in FIGS. 1, 3) provides relief between the switch closure 12 (as shown in FIGS. 1, 2) and the stopping of the saddle nut 4 (as shown in FIGS. 1, 3, 4) movement.

Another limit switch 6 (as shown in FIGS. 1, 2) is mounted into the conveyor track 2 (as shown in FIGS. 1, 3) just short of the power drive and electronics control box 1 (as shown in FIGS. 1, 3). This limit switch assembly 6 (as shown in FIGS. 1, 2) consists of a micro-switch with a traveler spring arm 6 (as shown in FIGS. 1, 2) that passes through the channel that the saddle nut 4 (as shown in FIGS. 1, 3, 4) travels through. This micro-switch with a traveler spring arm 6 (as shown in FIGS. 1, 2) provides some timing relief between the switch closure 6 (as shown in FIGS. 1, 2) and the stopping of the saddle nut 4 (as shown in FIGS. 1, 3, 4) movement.

Acme Lead Screw

The Acme lead screw 11 (as shown in FIGS. 2, 4) is affixed to the power drive motor shaft 17 (as shown in FIG. 5) using a fixed coupling and a socket head setscrew located in the lead screw coupling 10 (as shown in FIGS. 2, 4). This setscrew affixes the Acme lead screw 11 (as shown in FIGS. 2, 4) to the power drive motor shaft 17 (as shown in FIG. 5) by tightening to the surface of a Weldon flat located on one side of the power drive motor shaft 17 (as shown in FIG. 5).

The Acme lead screw 11 (as shown in FIGS. 2, 4) is captured inside the conveyor track cavity 2 (as shown in FIGS. 1, 3) and held in place by the limit switch end cap 3 (as shown in FIGS. 1, 3), power drive motor shaft 17 (as shown in FIG. 5) and the saddle nut 4 (as shown in FIGS. 1, 3, 4). The Acme lead screw 11 (as shown in FIGS. 2, 4) is driven in either direction by the power drive motor 7 (as shown in FIGS. 2, 5) and gear reduction 8 (as shown in FIGS. 2, 5) located in the power drive and electronics control box 1 (as shown in FIGS. 1, 3).

Carrier System

Saddle Nut

The functional mechanism of the invention is the saddle nut 4 (as shown in FIGS. 1, 3, 4), which rides along an Acme lead screw 11 (as shown in FIGS. 2, 4). The saddle nut 4 (as shown in FIGS. 1, 3, 4) is threaded onto the Acme lead screw 11 (as shown in FIGS. 2, 4) and travels the length of the Acme lead screw 11 (as shown in FIGS. 2, 4) until contact with either limit switch 6, 12 (as shown in FIGS. 1, 2) located in the conveyor track 2 (as shown in FIGS. 1, 3) or in the limit switch end cap 3 (as shown in FIGS. 1, 3). Using a gear reduction 8 (as shown in FIGS. 2, 4) between the motor and lead screw (as shown in FIGS. 1, 2, 4) allows the reduction in the RPM of the motor to a more useful rotational speed and provides an increased amount of torque.

The saddle nut 4 (as shown in FIGS. 1, 3, 4) is captured between the inside cavity of the conveyor track 2 (as shown in FIGS. 1, 3) and the Acme lead screw 11 (as shown in FIGS. 2, 4). A saddle nut flange 4 (as shown in FIGS. 1, 3, 4) is allowed to protrude through a slot, which runs the length of the conveyor track 2 (as shown in FIGS. 1, 3), and provides access between the Acme lead screw 11 (as shown in FIGS. 2, 4) cavity and the outside hanger hook holes 4 (as shown in FIGS. 1, 3, 4).

Basket and Hanger

The carrier 14 (as shown in FIGS. 1, 6) is a simple wire framed basket outfitted with two hanger hooks 15 (as shown in FIG. 6) that allow it to be hung from the saddle nut 4 (as shown in FIGS. 1, 3, 4). The carrier 14 (as shown in FIGS. 1, 6) is used to transport items from one end of the device to the other. This is only one of many types of containers that may be affixed to the device's saddle nut. Other types may include coat hangers, mesh bags with drawstrings, or carabineers attached to any type of container whose contents weigh a minimal amount.

The basket 14 (as shown in FIGS. 1, 6) is made from a wire mesh and comprises a pair of hanger handles, which capture a pair of hanger hooks 15 (as shown in FIG. 6).

The two basket hanger hooks are placed through two hanger hook holes located in the sides of the saddle nut flange 4 (as shown in FIGS. 1, 3, 4).

Theory of Operation

The operational control of the invention is similar to that of a common garage door opener. Pushing any of the start/stop buttons will initiate the invention to move the carrier and its contents in the direction away from either end of the conveyor track 2 (as shown in FIGS. 1, 3). When the carrier 14 (as shown in FIGS. 1, 6) reaches the opposite end of the conveyor guide rail the device will automatically stop. Upon pressing the start/stop button the carrier 14 (as shown in FIGS. 1, 6) will move back to the opposite end of the conveyor track 2 (as shown in FIGS. 1, 3). The start/stop button may also be used to stop the travel of the carrier 14 (as shown in FIGS. 1, 6) at any point in its cycle. When pressed again after stopping, it will resume in the opposite direction and return back to its starting point unless the start/stop button is yet again pressed.

Installation of the device is simple. The device is affixed to the roof liner of the vehicle using small screws located at the rib points in the vehicles roof. Power for the device may be obtained from the vehicles electrical system by tapping into the fuse box. The device may share the same fuse with the vehicles widow wipers or other comparable systems that use a fused circuit.

The invention is also designed such that it may be customized to the correct length as needed in any given vehicle by removing the guide rail limit switch end cap 3 (as shown in FIGS. 1, 3) and trimming the non-power drive end of the conveyor track 2 (as shown in FIGS. 1, 3) and Acme lead screw 11 (as shown in FIGS. 2, 4).

The foregoing description details certain preferred embodiments of the present invention and describes the best mode contemplated. It will be appreciated, however, that no matter how detailed the foregoing description appears, the invention can be practiced in many ways without departing from the spirit of the invention. Therefore, the description contained in this specification is to be considered exemplary, rather than limiting, and the true scope of the invention is only limited by the following claims and any equivalents thereof.

What is claimed is:

1. A horizontal conveyance device for conveying items back and forth throughout a substantially horizontal space, said horizontal conveyance device comprising:
   a lead screw,
   a saddle nut wherein said saddle nut has matching inside thread to said lead screw thread and thus surrounds said lead screw and is thereby capable of moving forward and backward along said lead screw,
   a substantially horizontal conveyor track system having a relatively rigid yet malleable and horizontal structure into which said lead screw is secured and which prohibits the saddle nut from rotating 360° about the lead screw, causing said saddle nut to move backward and forward through said space;
   a bi-directional power drive and electronics control box system wherein said bi-directional power drive provides power to engage via the use of a gear reducer to the lead screw and said electronic control box system provides control logic to drive said lead screw backward and forward and whereby said power drive and electronics control box system is powered from an extant power source,
   and a carrier system.

2. A power drive and electronics control box system of claim 1 further comprising:
   a power drive and electronics control box enclosure and cover,
   a bi-directional power drive motor with gear reduction,
   a power drive lead screw coupling,
   a power drive motor shaft with coupling flat,
   and a control logic circuit board wherein digital and analog circuitry exists so as to provide power to the power drive in response to external input and to change the direction of said power drive.

3. The horizontal conveyance device of claim 1 wherein the conveyor track system further comprises:
   a conveyor track,
   an end cap,
   travel limit switches wherein when a travel limit switch is closed it stops the power drive and thus the linear translation movement of the lead screw is also stopped,
   and mounting screw holes.

4. A hanging carrier system of claim 1 further comprising:
   a carrier made of relatively rigid materially and capable of holding and securing items for conveyance along the guide track,
   and a means for securing said carrier to said saddle nut.

5. A conveyor track of claim 3 further comprising:
   a flexible extruded composite material such that the flexible conveyor track is able to conform to irregular mounting surfaces.

* * * * *